US008320292B2

(12) United States Patent
Dorenbosch (10) Patent No.: US 8,320,292 B2
(45) Date of Patent: Nov. 27, 2012

(54) METHOD TO CONTROL A MULTIMEDIA BROADCAST MULTICAST SERVICE(MBMS) MODE OF A MBMS SESSION IN A COMMUNICATION SYSTEM

(75) Inventor: Jheroen P. Dorenbosch, Paradise, TX (US)

(73) Assignee: Motorola Mobility LLC, Libertyville, IL (US)

( * ) Notice: Subject to any disclaimer, the term of this patent is extended or adjusted under 35 U.S.C. 154(b) by 388 days.

(21) Appl. No.: 12/620,685

(22) Filed: Nov. 18, 2009

(65) Prior Publication Data

US 2011/0116433 A1 May 19, 2011

(51) Int. Cl.
*H04H 20/71* (2008.01)
*H04W 4/00* (2009.01)

(52) U.S. Cl. .......................... 370/312; 370/329; 370/432
(58) Field of Classification Search .................. None
See application file for complete search history.

(56) References Cited

U.S. PATENT DOCUMENTS

| 2002/0025826 | A1 | 2/2002 | Aaltonen et al. | |
| 2006/0148408 | A1 | 7/2006 | Cho et al. | |
| 2007/0293229 | A1 | 12/2007 | Khan | |
| 2008/0274759 | A1* | 11/2008 | Chen et al. | 455/507 |
| 2008/0311926 | A1* | 12/2008 | Fischer et al. | 455/452.1 |
| 2008/0311949 | A1* | 12/2008 | Koskinen et al. | 455/525 |
| 2008/0316952 | A1* | 12/2008 | Gruber et al. | 370/312 |
| 2010/0110961 | A1* | 5/2010 | Chao et al. | 370/312 |
| 2011/0021224 | A1* | 1/2011 | Koskinen et al. | 455/507 |

FOREIGN PATENT DOCUMENTS

| WO | 2006104346 A1 | 10/2006 |
| WO | 2006105010 A1 | 10/2006 |

\* cited by examiner

*Primary Examiner* — Robert Scheibel (57) ABSTRACT

A method to control a multimedia broadcast multicast service (MBMS) mode of a MBMS session in a communication system is provided herein. In operation, a first network element that is located outside a radio access network determines to use one of a single frequency network MBMS mode and a single cell MBMS mode for the MBMS session based on a property of the MBMS session. The first network element then transmits a session control signaling message to a second network element that is located inside the radio access network. The session control signaling message instructs the second network element that user plane data for the MBMS session shall be transmitted using the determined MBMS mode. The base stations then transmit the user plane data to one or user equipments in a target service area according to the determined MBMS mode.

18 Claims, 6 Drawing Sheets

FIG. 6 under US 8,320,292 B2

METHOD TO CONTROL A MULTIMEDIA BROADCAST MULTICAST SERVICE(MBMS) MODE OF A MBMS SESSION IN A COMMUNICATION SYSTEM

FIELD OF THE DISCLOSURE

The present disclosure relates generally to communication systems and more particularly to a method to control a multimedia broadcast multicast service (MBMS) mode of a MBMS session in a communication system.

BACKGROUND

Multimedia Broadcast Multicast Services (MBMS) are being implemented in communication systems. In MBMS, data for a service is transmitted in one or more consecutive MBMS sessions of finite duration. MBMS data for such a session can be transmitted using an MBMS mode across a set of cells called a service area. MBMS data can be transmitted in several modes. MBMS data can be transmitted in synchronized fashion in multiple cells in a service area in what is called a single frequency network (SFN) MBMS mode or SFN mode. MBMS data can also be transmitted independently in non-synchronized fashion in multiple cells in a service area in what is called a single cell (SC) MBMS mode or SC mode. For SFN mode, the base stations in the service area transmit identical MBMS user plane data at the same time and at the same frequency in each of the cells of the service area. For SC mode transmission, the base stations schedule and transmit the user plane data independently in some or all of the cells of the service area.

In existing communication systems, the decision whether to transmit MBMS data for a service using SFN mode or SC mode is normally determined by pre-configuration. The operator may configure a mode for a service which typically is defined for an entire period of the MBMS service. In advanced implementations, the decision on whether to transmit the data in SFN mode or SC mode may be made by a network element (NE) in a radio access network (RAN). In such an advanced implementation, when a MBMS session is initiated, the network element located in the RAN may instruct the base stations that are under the NE's control to probe for interested radio terminals. As used herein, the term 'interested' denotes those radio terminals that should or will receive user plane data for the MBMS session. To probe for interested radio terminals, the base stations wake up the radio terminals, perform counting procedures to estimate the number of interested terminals, and then report the results of the counting to the network element, which in turn decides the MBMS mode. Counting procedures are described in the "3rd Generation Partnership Project; Technical Specification Group Radio Access Network; Introduction of the Multimedia Broadcast Multicast Service (MBMS) in the Radio Access Network (RAN)" [3GPP TS 25.345] which is included here by reference. This advanced implementation may lead to increased system efficiency, but has a much longer setup time. Moreover, the decision may not be always optimal when the network element decides to use a particular MBMS mode based on fixed parameters. In addition, when multiple NEs in the RAN are involved in the decision, additional communication is needed between those NEs, which lead to increased system complexity.

In some applications, a fast setup of the session may be more important than efficiency. Examples are a Tsunami warning or an emergency video transmission to a public safety group. In such cases, the network elements located within the radio access network may not have enough information about the importance or nature of the data to be transmitted and may decide to use a MBMS mode which may not be optimal for the service.

In other applications, terminals wishing to receive the MBMS service may be highly mobile and may require a specific MBMS mode that supports such high mobility. An example of such an application is the transmission of data to ambulances and fire trucks, where ambulances and fire trucks will be making many cell changes and will benefit from the uniform coverage provided by SFN mode. However, the automatic selection method used by the network element located in the RAN may incorrectly decide to use SC mode based on the sparse distribution of terminals in the service area. Yet other applications may require low latency, for example transmission of real time voice to a public safety group. In such cases, the service provider may prefer to use the smaller buffer size of a MBMS mode. However existing communication systems does not facilitate a service provider to control the MBMS mode of a MBMS session other than through pre-configuration.

Accordingly, there is a need for a solution that would facilitate service providers to control the mode of data transmission in communication systems supporting multimedia broadcast multicast service.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method to control a multimedia broadcast multicast service (MBMS) mode of a MBMS session in a communication system is provided herein. In operation, a first network element that is located outside a radio access network determines to use one of a single frequency network MBMS mode and a single cell MBMS mode for the MBMS session based on a property of the MBMS session. The first network element then transmits a session control signaling message to a second network element that is located inside the radio access network. The session control signaling message instructs the second network element that user plane data for the MBMS session shall be transmitted using the determined MBMS mode. The base stations then transmit the user plane data to one or user equipments in a target service area according to the determined MBMS mode.

Figure 1:
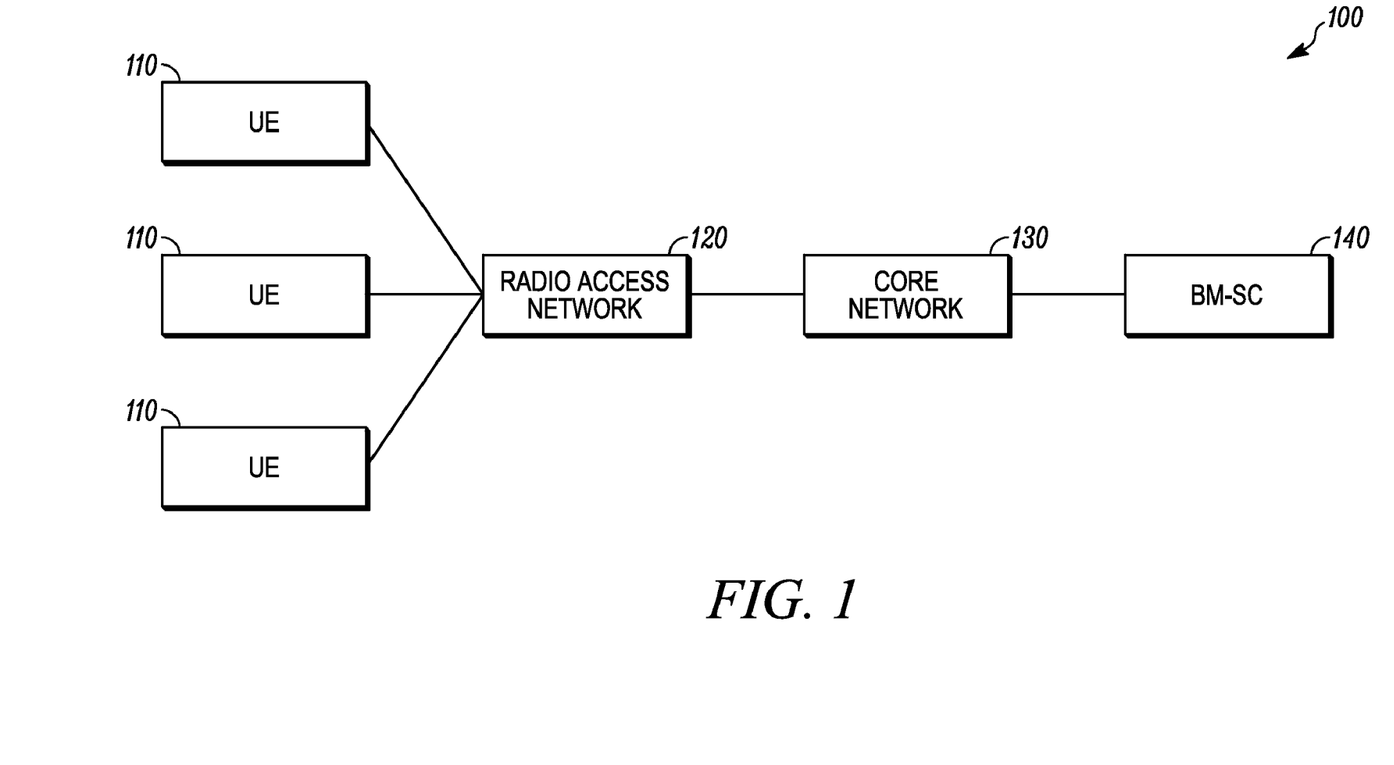
FIG. 1 is a block diagram illustrating basic structure of a communication system employing a method to control a multimedia broadcast multicast service mode of a multimedia broadcast multicast service (MBMS) session in accordance with some embodiments.

FIG. 1 is a block diagram illustrating a basic structure of a communication system 100 employing a method to control a multimedia broadcast multicast service (MBMS) mode of a MBMS session in accordance with some embodiments. The communication system 100 comprises a plurality of radio terminals or user equipments (UE) 110, a radio access network (RAN) 120, a core network 130, and a broadcast multicast service center (BM-SC) 140. The radio access network 120 provides wireless access to the user equipments 110. The core network 130 provides communication services to the user equipments 110 via the radio access network 120. The core network 130 provides different functionalities including, but not limited to providing authentication to user equipments 110 for services, call control/switching, and maintenance of a subscriber database.

In communication systems supporting multimedia broadcast multicast services, for example, in communication system 100, the broadcast multicast service center (BM-SC) 140 is additionally included to mediate between content providers and/or service providers (not shown) for the MBMS services and the network (core network 130 and RAN 120). The BM-SC 140 is overall responsible for both control plane data and user plane data of an MBMS service. As used herein, the control plane data, which is also signaling data or signaling, refers to transmission of control information across an interface of a network, for example for the management of MBMS data sessions. The user plane data refers to payload information for a UE 110 and eventually for its user, for example, video data, voice data, application data and multimedia content for the MBMS service. The BM-SC 140 is also responsible for authenticating and authorizing the content providers and/or service providers, receiving and possibly modifying the data, for example, by encrypting the content received from the content/service providers and transmitting the encrypted data to the core network 130 for further transmission to user equipments 110 via the radio access network 120. The BM-SC 140 also may provide information about its services for both service announcement and bearer setup purposes, authenticate UEs 110 wishing to join a multicast session, and initiate MBMS session start, modify, and stop signaling.

Although the BM-SC 140 is shown as physically separated from the core network, the BM-SC 140 can also be implemented as a part of the core network 130. In one embodiment, the BM-SC 140 may be implemented as a single server or a network element. In one embodiment, the BM-SC 140 is implemented in distributed fashion, where different servers or different network elements perform the different functionalities of the BM-SC 140. In any embodiment, the functionality of BM-SC 140 is performed by one or more network elements that are located outside the RAN 120. Some or all of the functionality may be provided, for example, by a dispatch console or dispatch server in a Public Safety system, a server connected to an emergency warning system, or by a video server in a mobile television (TV) system.

As used herein, "MBMS" refers to a downlink transmission service for providing data services such as, streaming services (e.g., multimedia, video on demand, webcast) or background services (e.g., warning messages, bulk e-mail, short message services (SMS), downloading, local information, advertisements), to a plurality of user equipments 110 by employing a downlink dedicated MBMS bearer service. MBMS user plane data can be transmitted in either a single frequency network (SFN) MBMS mode or a single cell (SC) MBMS mode. The transmission is directed at a set of cells, which is referred to as a MBMS service area or a service area or a target service area. In SFN mode, MBMS user plane data is transmitted in synchronized fashion (simulcast) in the cells of the target service area in multi-cell transmission. The multi-cell simulcast transmission area is called as a single frequency network. In SFN mode, base stations (also referred to as Node-Bs or eNBs, see FIGS. 2 and 3) in the single frequency network transmit identical MBMS data at the same time and at the same frequencies. In SC mode, MBMS data is transmitted independently in multiple cells. For single cell transmission, the user plane data is scheduled and transmitted independently in each of the cells of the service area. In some embodiments, the user plane data is not transmitted when there is no UE 110 in the cell that is interested in receiving the MBMS data.

Figure 2:
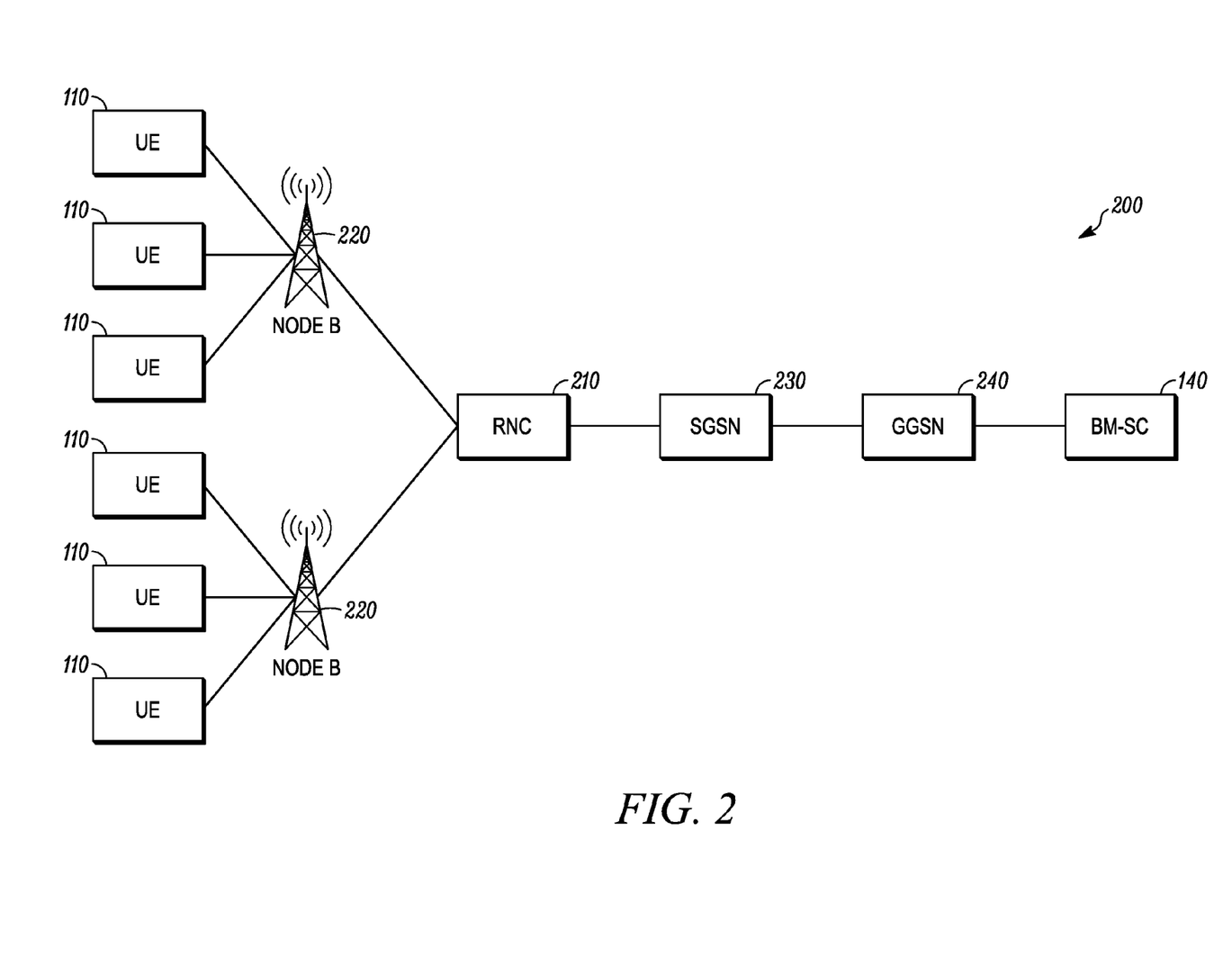
FIG. 2 is a block diagram of a UTRAN based communication system employing a method to control a MBMS mode of a MBMS session in accordance with some embodiments.

The RAN 120 and the core network 130 include one or more network elements to perform its various functionalities. FIG. 2 shows a UTRAN based communication system 200 employing a method to control a multimedia broadcast multicast service (MBMS) mode of a MBMS session. UTRAN refers to UMTS (Universal Mobile Telecommunication System) Terrestrial Radio Access Network. In a UTRAN based communication system 200, the RAN 120 comprises network elements such as a radio network controller 210 and a plurality of Node-Bs 220. Each Node-B 220 provides coverage area to zero or more user equipments 110. Such coverage area is referred to as a cell. In one embodiment, the single base station (Node-B 220) services multiple cells or sectors. The radio network controller (RNC) 210 provides control functionalities for one or more Node-Bs 220. Control functionalities include assigning and managing of radio resources. The system 200 can comprise multiple radio network controllers 210, where each RNC 210 provides control functionalities to a different group of Node-Bs 220.

The UMTS core network 130 comprises network elements such as a Serving GPRS (general packet radio service) Support Node (SGSN) 230 and a Gateway GPRS Support Node (GGSN) 240. The RNC 210 is connected to a SGSN 230, which in turn is connected to a GGSN 240. The SGSN 230 is capable of communicating with multiple RNCs 210. In some embodiments, the GGSN 240 is capable of communicating with multiple SGSNs 230. GGSN 240 is in communication with the BM-SC 140 that interacts with the content providers and/or service providers. In some embodiments, the communication system 200 utilizes multiple GGSNs 240. The GGSN 240 receives MBMS user plane data and control plane data for an MBMS session from the BM-SC 140 and transmits the data to one or more SGSNs 230, where each SGSN 230 in turn sends the MBMS data to one or more RNCs 210 for further transmission to node-Bs 220. The Node-Bs 220 transmit the user plane data and some of the control plane data to the user equipments 110.

Figure 3:
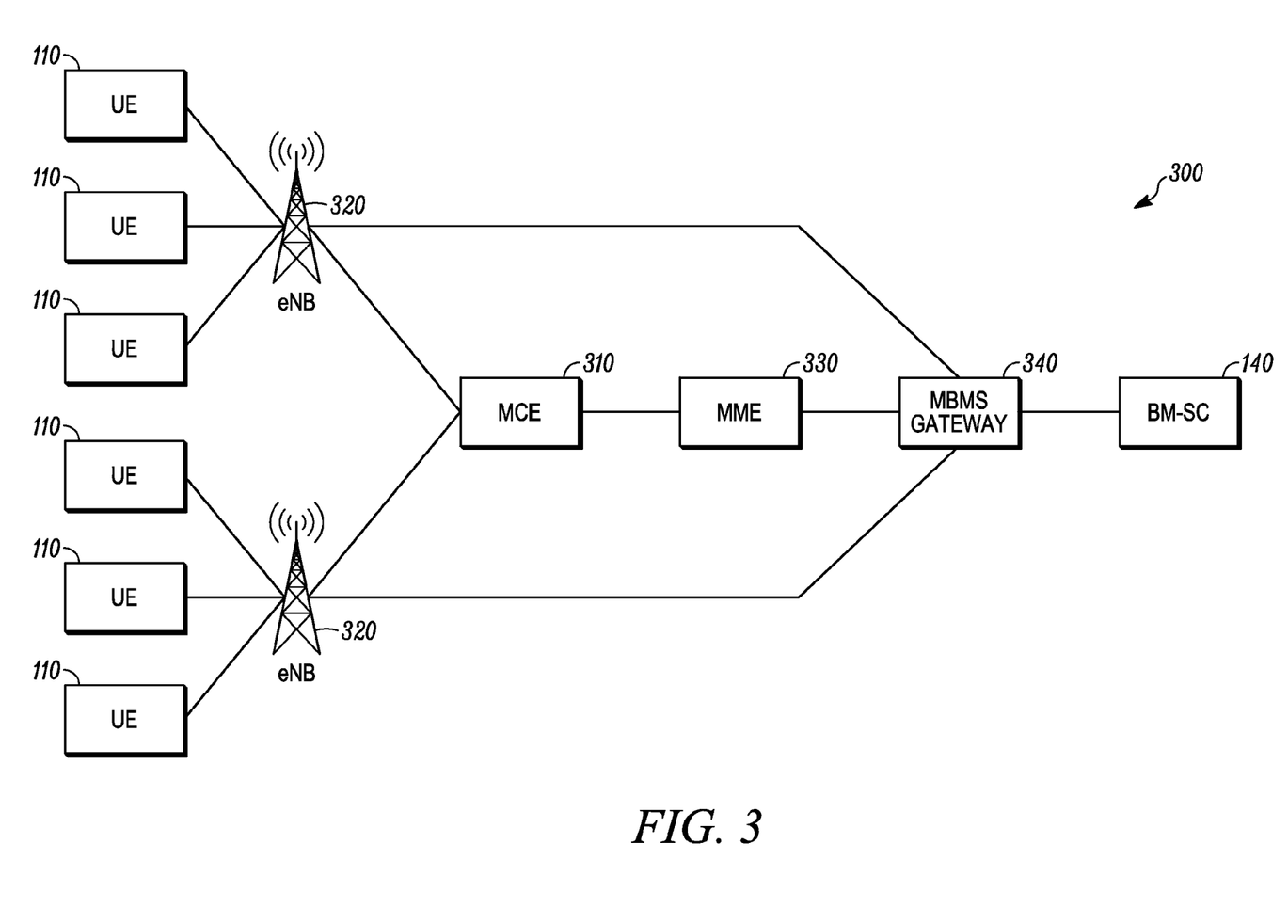
FIG. 3 is a block diagram of an LTE based communication system employing a method to control a MBMS mode of a MBMS session in accordance with some embodiments.

FIG. 3 shows an LTE based communication system employing a method to control a multimedia broadcast multicast service (MBMS) mode of a MBMS session. LTE refers to Long Term Evolution. In LTE based communication system 300, the Node-B 220 of UTRAN communication system 200 is replaced by evolved Node-B (eNB). The radio access network 120 of LTE system 300 comprises a multicast coordination entity (MCE) 310 and a plurality of eNBs 320. The eNBs 320 control the allocation of radio resources in the LTE system 300. The MCE 310 coordinates the usage of the part of radio resources that is used for MBMS between different eNBs 320. The LTE system 300 can include multiple MCEs 310, where each MCE 310 controls a different logical group of eNBs.

The core network 130 of LTE system 300 comprises a mobile management entity (MME) 330 and an MBMS gateway 340. The MCE 310 is connected to a MME 330 which is in communication with an MBMS gateway 340. The MBMS gateway 340 is in communication with the BM-SC 140. In accordance with some embodiments, the LTE system 300 includes multiple MMEs 330 and multiple MBMS gateways 340. The MBMS gateway 340 receives MBMS control plane data (signaling) for an MBMS session from the BM-SC 140 and transmits the control plane data to one or more MMEs 330, where each MME 330 in turn sends the MBMS control plane data to one or more MCEs 310 for further transmission to eNBs 320. The eNBs 320 transmit some of the control plane data to the user equipments 110. The MBMS gateway 340 receives MBMS user plane data for an MBMS session from the BM-SC 140 and transmits the user plane data to one or more eNBs 320. The eNBs 320 in turn transmit the MBMS user plane data in the cells to the UEs 110. In LTE, the MBMS user plane data is distributed to the eNBs 320 using internet protocol (IP) multicast and the eNBs 320 join the IP multicast distribution if there is a need to transmit the MBMS user plane data to the UEs 110.

MBMS control plane data is transmitted in the form of control messages over the interfaces between the network elements and then between the Node-Bs 220 (or eNBs 320) and the UEs 110. Such messages may be session control signaling messages that, for example, define the start and the end of a session of a MBMS service, or may convey that a MBMS session is being modified. In one embodiment, a signaling message is targeted to a specific service area and the target service area is identified in the signaling message. When a BM-SC 140 sends a signaling message towards a service area, the signaling message is sent to each GGSN 240/MBMS gateway 340 that serves the service area. The GGSN 240/MBMS gateway 340 in turn forwards the signaling message to each SGSN 230/MME 320 that serves the service area. The SGSN 230/MME 330 then forwards the message to the RNCs 210/MCEs 310 for the service area. The RNC 210/MCE 310 then sends the signaling message to each Node-B 220/eNB 320 that serves a cell in the target service area. The signaling messages from the RNC 210/MCE 310, which are located in the RAN 120, instruct the base stations (Node-Bs 220/eNBs 320) to use the SFN mode or the SC mode for the transmission of the user plane data of a MBMS session. In one embodiment, different MBMS sessions that overlap in time uses different MBMS modes.

Figure 4:
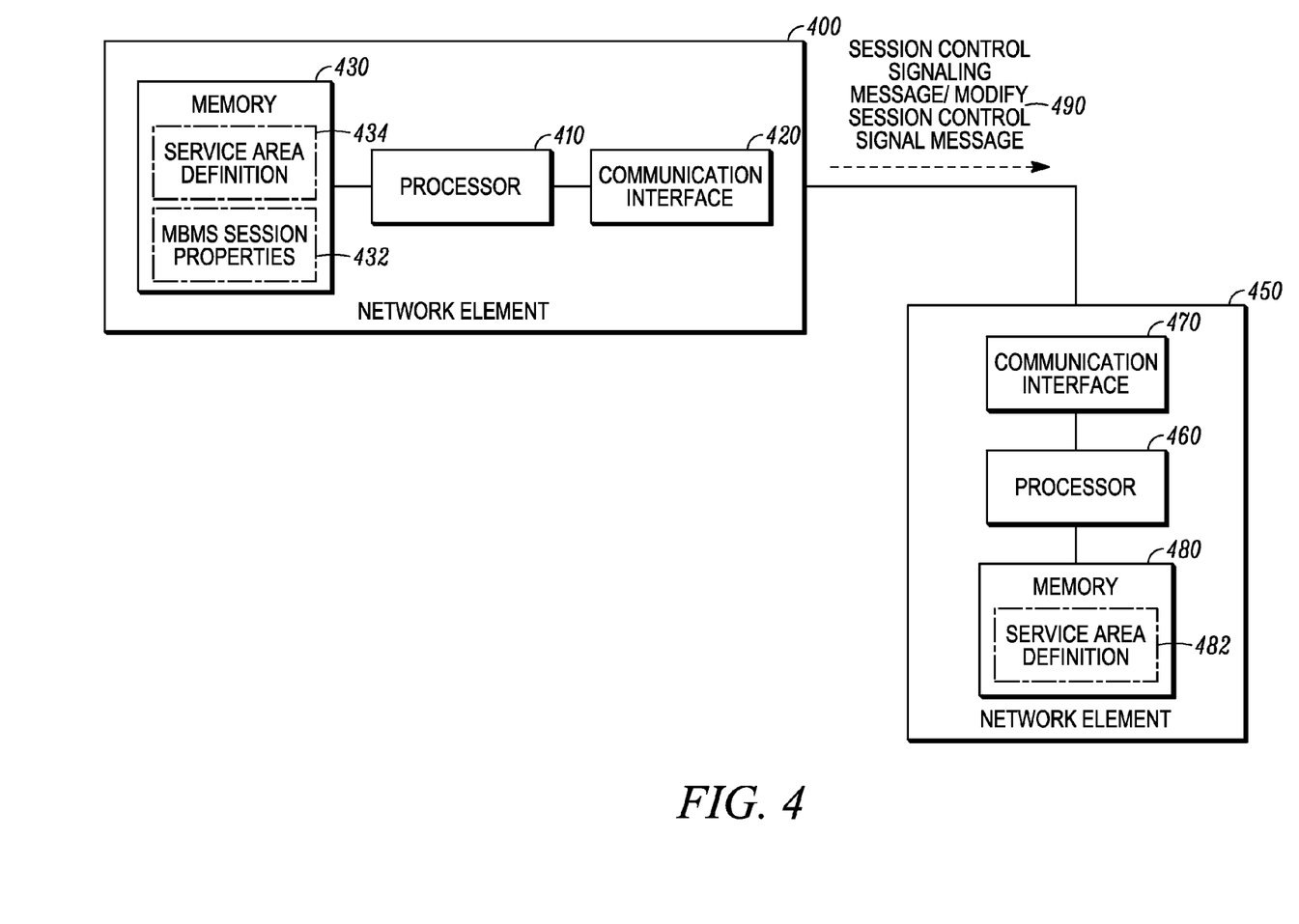
FIG. 4 is a block diagram illustrating further detail of a first network element that is located outside a radio access network and a second network element that is located inside the radio access network employed in the communication system shown in FIG. 1.

The service provider and/or content provider (not shown) uses a network element 400 that is located outside of the radio access network 120 to control an MBMS mode to be used for transmitting user plane data from the Node-Bs 220 or eNBs 320 to the user equipments 110. FIG. 4 is a block diagram illustrating further detail of a first network element 400 that is located outside a radio access network 120 and a second network element 450 that is located inside the radio access network 120 employed in the communication system 100 shown in FIG. 1. The network element 400 that is located outside the radio access network 120 can refer to one of the BM-SC 140, GGSN 240, SGSN 230, MME 330, and MBMS gateway 340, and herein after referred to as network element 400. The network element 450 located inside the radio access network 120 can refer to one of RNC 210, MCE 310, Node-B 220, and eNB 320, and herein after referred to as network element 450.

As shown in FIG. 4, the network element 400 includes a processor 410, a communication interface 420, and a memory 430. The network element 450 includes a processor 460, a communication interface 470, and a memory 480. The processor 410, 460 includes one or more microprocessors, microcontrollers, DSPs (digital signal processors), state machines, logic circuitry, or any other device or devices that process information based on operational or programming instructions in accordance with embodiments. Such operational or programming instructions are stored in the memory 430, 480. The memory 430, 480 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 410, 460 has one or more of its functions performed by a state machine or logic circuitry, the memory 430, 480 containing the corresponding operational instructions can be embedded within the state machine or logic circuitry.

The communication interface 420, 470 includes appropriate hardware and software architecture in accordance with known techniques that enable communication of control and/or user plane data between the network element 400 outside the RAN 120 and the network element 450 inside the RAN 120. In accordance with some embodiments, if the network element 450 inside the radio access network refers to a Node-B 220 or eNB 320, the communication interface 470 comprises a wireless interface for transmitting user plane data and/or control plane to the user equipments 110 and a wired interface for communication with the RNC 210/MCE 310. If implemented as a wireless interface, the communication interface 470 includes an antenna (not shown) that comprises any known or developed structure for radiating and receiving electromagnetic energy in the frequency range containing the wireless carrier frequencies.

The memory 430 stores information related to MBMS session properties 432. The MBMS session properties 432 include one or more of: a number of user equipments 110 that will receive user plane data for the MBMS session, locations of the user equipments 110 that will receive the user plane data, mobility of the user equipments 110 that will receive the user plane data, priority level of the user plane data, and media type of the user plane data. In accordance with embodiments, the network element 400 located outside a radio access network 120 determines to use the SFN mode or the SC mode based on the MBMS session properties 432 stored in the memory 430. The memory 430 included in the network element 400 optionally stores service area definition information 434. A service area defines a set of cells to which the user plane data for a MBMS session should be directed. For example, a service area that is used to cover the geographic area of downtown Amsterdam in SC mode may contain all cells with a transmitter that is located within the perimeter of the Herengracht. The service area definition information 434 includes information about multiple service areas and in particular information related to a group of service areas that substantially comprise a same set of cells. A service area definition may be represented by a unique service area value, code, or identifier. The network element 450 also maintains corresponding service area definition information 482 in the memory 480. Service area definition information 434 and 482 may be stored in identical form, but may also use different representations. For example, service area definition information 434 in network element 400 may be stored as a name (e.g. "downtown Amsterdam SC") while service area definition information 482 in network element 450 may be stored as a list of cell identification numbers.

In accordance with some embodiments, the network element 400 uses this service area definition information 434 to instruct the network element 450 about the determined MBMS mode. In such embodiments, the network element 450 identifies the MBMS mode determined by the network element 400 using the maintained service area definition 482 which is discussed in detail with reference to FIG. 6. Network element 400 and network element 450 may use communication interfaces 420, 470 to communicate session control signaling messages/modify session control signaling message 490 over a network (not shown). The session control signaling message/modify session control signal message 490 instructs the network element 450 that user plane data for the MBMS session shall be transmitted using an MBMS mode determined by the network element 400.

Figure 5:
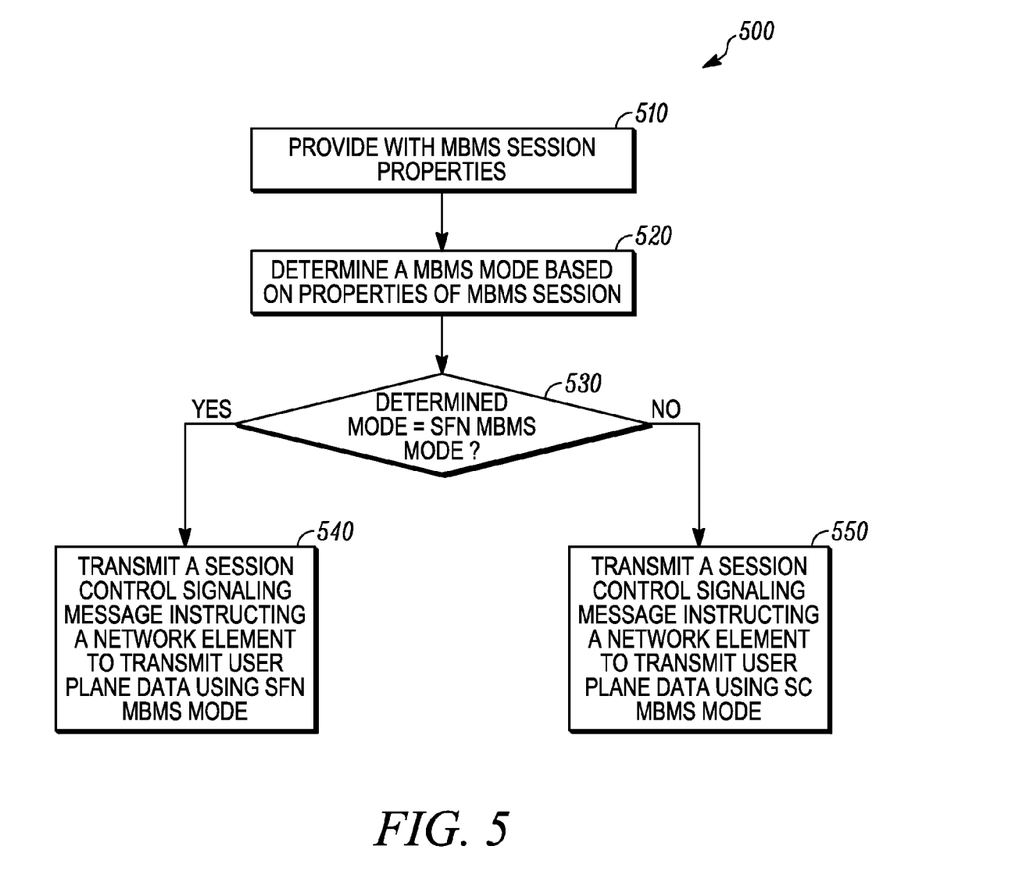
FIG. 5 is a flowchart illustrating a method of operation of a radio network element that is located outside a radio network to control the MBMS mode of a MBMS session in the communication system in accordance with some embodiments.

FIG. 5 is a flowchart illustrating one method 500 of operation of a network element 400 that is located outside a radio access network 120 to control the MBMS mode of a MBMS session in the communication system 100, 200. The method 500 may be initiated either before or at the beginning of, or during a MBMS session for a MBMS service. At step 510, the network element 400 is provided with one or more properties of the MBMS data for a MBMS session, referred to as MBMS session properties 432 which are discussed with reference to step 520. Optionally, the network element 400 stores the MBMS session properties 432 in the memory 430. Next at step 520, the network element 400 determines to use a SFN mode or SC mode based on the MBMS session properties 432. Next, at step 530, when the network element 400 decides to use SFN mode for the MBMS session, the network element 400 proceeds to step 540 to transmit a session control signaling message 490 associated with the start of the session to instruct one or more network elements 450 (e.g. the RNC 210/MCE 310 or the Node-B 220/eNB 320) inside the RAN 120 to use the SFN mode when a user plane data is transmitted from the Node-B 220 or eNB 320 to user equipments 110 in the target service area.

Returning to step 530, when the network element 400 decides to use SC mode for the MBMS session, the network element 400 proceeds to step 550 to transmit a session control signaling message 490 associated with the start of the session to instruct one or more network elements 450 (e.g. the RNC 210/MCE 310 or the Node-B 220/eNB 320) inside the RAN 120 to use the SC mode when a user plane data is transmitted from the Node-B 220 or eNB 320 to user equipments 110 in the target service area. The network element 450 located inside the RAN 120 uses the session control signaling message 490 received from the network element 400 to instruct the base stations (Node-B 220/eNB 320) to transmit user plane data using the determined MBMS mode. The further details and alternative implementations of some of the steps of the method 500 are discussed below.

In one embodiment, at step 520, the network element 400 receives signaling from a content and/or service provider that includes one or more MBMS session properties 432, such as overall bit rate, latency requirements, video and voice encoders that are to be used, jitter requirements, and the like. The network element 400 obtains some or all of this information, for example, from real time protocol (RTP) specification in the session setup messages received. For example, when the network element 400 detects that the session has the characteristics of a TV broadcast, the network element 400 determines (step 520) to use the SFN mode and when the network element 400 detects voice communication, the network element 400 may determine to use the SC mode.

In accordance with some embodiments, the network element 400 obtains (step 510) information about the urgency of the delivery of the user plane data for a MBMS session. The network element 400 derives this information from a priority identifier or an urgency identifier that is present in the user plane data or the control plane data of the MBMS session. In one embodiment, the network element 400 derives this information from a source identity that identifies a source of the data. For example, data from an emergency room of a hospital would be considered to have higher priority than data from an advertizing agency. The network element 400 then determines (step 520) the MBMS mode, based on the urgency of the session. The network element 400 may also base its determination (step 520) of MBMS mode on the time of day.

In accordance with some embodiments, the network element 400 receives (step 510) information on the number of user equipments 110 in a session's service area that is interested in or subscribing to the MBMS session and that will be receiving user plane data for the MBMS session. A content/service provider may derive that information by tracking the locations of all interested user equipments 110 or of a representative subset of user equipments 110. The network element 400 then uses this information to estimate the average number of user equipments 110 per cell and base the determination of the MBMS mode on the average number of user equipments 110 per cell. For example, when the density of user equipments 110 is low, the network element 400 biases its determination (step 520) towards the use of the SC mode.

In accordance with some embodiments, the network element 400 obtains (step 510) information about mobility of the user equipments 110 that will be receiving user plane data for the MBMS session. The network element 400 determines, for example an average rate at which the user equipments 110 change cells. When the determined rate is low, the network element 400 may bias its determination (step 520) towards the use of the SC mode. In some embodiments, the network element 400 determines (step 520) to use SFN mode or SC mode based on more than one kind of information. Some of the information on which a decision to use SFN mode or SC mode is based may change during a session. In one embodiment, the mobility of the user equipments 110 may decrease, for example when most user equipments that are interested in a session arrive at a work place. Also the number of interested user equipments 110 may increase, for example, when user equipments 110 that will be receiving user plane data associated with the MBMS session are switched on (or active) in a particular time period (e.g. morning) of a day.

As a result of changing information, the network element 400 also decides to change the MBMS mode of a session. In such cases, the network element 400 informs one or more network elements 450 inside the RAN 120 of the new MBMS mode that shall be applied to the session, for example, by transmitting a modify session control message 490 to the network element 450. The network element 450 then instructs the Node-Bs 220/eNBs 320 to transmit the user plane data to the user equipments 110 using the modified MBMS mode.

In one embodiment, the network element 400 determines (step 520) to use the SFN mode or the SC mode while a session is in progress and dynamically changes the initially determined MBMS mode of the session. In this case, the network element 400 sends a modify session control signal message 490 to the network element 450 inside the RAN 120. The modify session control signal message 490 instructs the network element 450 to modify the MBMS mode for transmitting the MBMS user plane data from the Node-Bs 220/ eNB 320 to the user equipments 110. For example, the network element 400 determines to use SC mode for the MBMS session while the session is in progress using the SFN mode. In one embodiment, the network element 400 may decide to switch the MBMS mode from SFN mode to SC mode when the total number of interested UEs 110 in the service area falls below a certain threshold. In a service area with fewer interested user equipments 110, the SC mode may be more efficient because the Node-B 220/eNB 320 does not have to transmit the MBMS user plane data in a cell without UEs. Switching from SFN mode to SC mode is not trivial, because in SFN mode the system typically does not track the locations of the interested UEs 110 at the cell level.

In some embodiments, the switching from SC mode to SFN mode can be performed as follows: After determining that the switching is appropriate, the network element 400 sends a modify session control signal message 490 to the network element 450 to instruct the network element 450 to transmit the user plane data for the MBMS session in SC mode. Upon reception of the session control signaling message 490, the network element 450 establishes transmission of the user plane data in SC mode in all cells it serves or controls in the service area associated with the MBMS session. Next, to improve the efficiency for the session, the network element 450 uses known counting methods to determine or estimate the properties of the population of user equipments 110 that will receive the user plane data for the MBMS session in each controlled cell. Properties that are relevant are the number of interested user equipments 110 in each cell and the quality of the wireless connections of such user equipments 110. This estimation is done while the cells continue to transmit the user plane data in SC mode. For each controlled cell, the network element 450 compares the estimated properties of the user equipment population in that cell with one or more criteria to decide whether transmission of the user plane data in SC mode shall be ceased or continued. One criterion to cease transmission in SC mode may be that the population comprises less than one user equipment 110. If this criterion is met, transmission of the user plane data is ceased altogether in the cell. Another criterion to cease transmission in SC mode may be that the population includes less than a specific small number of user equipments 110. If this criterion is met, transmission may be continued in unicast mode for each of the user equipments 110. More elaborate criteria involve the quality of the wireless connections of the user equipments 110.

As mentioned above, the network element 400 instructs one or more network elements 450 located in the RAN 120 that user plane data for the MBMS session shall be transmitted using one of a SFN mode and a SC mode. In some embodiments, the network element 400 instructs the one or more network elements 450 in the RAN 120 to use a local optimization MBMS mode specifying to the one or more network element in the radio access network to select one of the SFN mode or the SC mode based on local optimization. For local optimization, the one or more network elements 450 in the RAN 120 use information obtained within the RAN 120 such as the average number of interested user equipments 110 per cell or the mobility of the interested user equipments 110.

In some embodiments, a session control signaling message 490 is defined on the interfaces between the network element 400 outside the RAN 120 and a network element 450 inside the RAN 12. The session control signaling message 490 explicitly instructs the network element 450 that for a specified session (e.g. identified by a session ID) the user plane data shall be transmitted in one of a SFN mode, a SC mode and a local optimization MBMS mode. In other embodiments, an information element is added to one or more existing session control signaling messages 490 on the interfaces between the network element 400 and the network element 450, for example, interface between the BM-SC 140 and the GGSN 240/MBMS gateway 340. The information element explicitly instructs the network element 450 that the user plane data for a specified session shall be transmitted in one of a single frequency network (SFN) MBMS mode, a single cell MBMS mode, and a local optimization MBMS mode. The new information element could be added, for example, to the Session Start request control and a Session Modification request control message.

In alternative embodiments, there is no need to define a new message or to add a new information element. In these embodiments, the network element 400 implicitly encodes the determined MBMS mode into one of the existing information elements in existing messages. These alternative embodiments are further discussed below with reference to FIG. 6.

Figure 6:
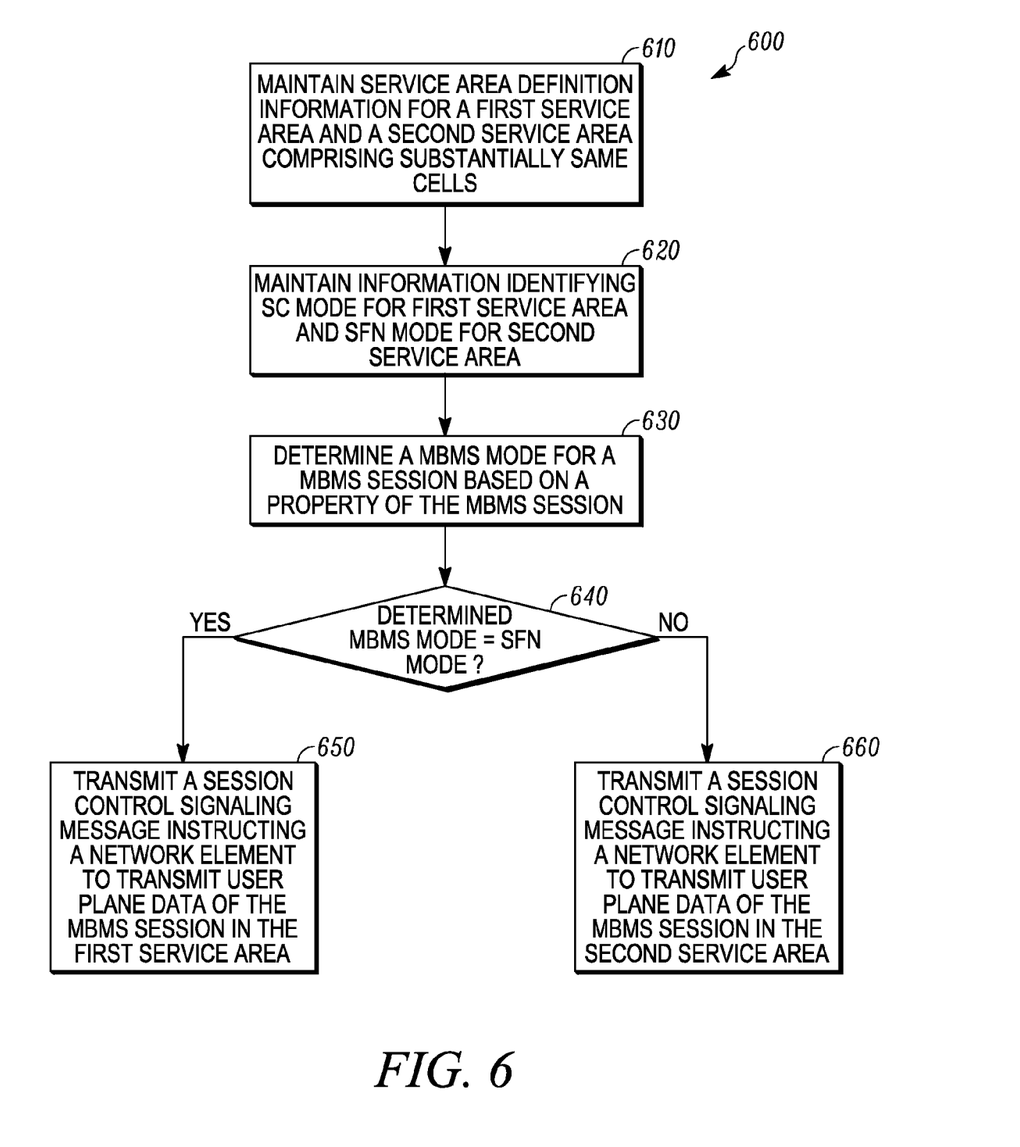
FIG. 6 is a flowchart illustrating a method of operation of a radio network element that is located outside a radio network to control the MBMS mode of a MBMS session in the communication system in accordance with some embodiments.

FIG. 6 is a flowchart illustrating another method 600 of operation of a network element 400 that is located outside a radio access network 120 to control the MBMS mode of a MBMS session in the communication system 100, 200, 300. The method 600 describes the alternative embodiment of implicitly instructing the determined MBMS mode to the network element 450 based on the service area definition information 434, 482 maintained in both the network element 400 and network element 450. As an example, the MBMS mode may be encoded in a value/code/identifier that is used to represent the service area. The network element 400 specifies one service area value/code/identifier for SFN mode and another service area value/code/identifier for SC mode. In these embodiments, both the service areas values/codes/identifiers are mapped into a set of cells that cover essentially the same geographic area. Thus, by specifying one service area value/code/identifier, the network element 400 can instruct a network element 450 in the RAN 120 to use the SFN mode in the geographic area and by specifying another service area value/code/identifier, the network element 400 can instruct the network element 450 to use SC mode in the geographic area.

As shown in step 610, the network element 400 outside the RAN 120 maintains service area definition information 434 related to a first service area identifying a first set of cells and a second service area identifying a second set of cells, where the first set of cells substantially comprises the second set of cells. Such service area definition information 434 is also stored in the network element 450 inside the RAN 120 as service area definition information 482. Next at step 620, the network element 400 maintains further information that MBMS user plane data corresponding to the first service area shall be transmitted in SFN mode and that MBMS user plane data corresponding to the second service area code shall be transmitted in single cell MBMS mode. Such information is also maintained in the network element 450.

At step 630, the network element 400 determines to use a SFN mode or SC mode based on one or more MBMS session properties 432. The step 630 may be initiated either before an MBMS session, or at the beginning of a MBMS session, or during a MBMS session for a MBMS service. Next, at step 640, when the network element 400 determines to use the SFN mode for a MBMS session based on a property of the MBMS session, the network element 400 proceeds to step 650 to transmit a session control signaling message 490 to a network element 450 in the RAN 120 (e.g. a RNC 210 or a MCE 310) and instruct the network element 450 to transmit the MBMS user plane data for the MBMS session in a first service area. Returning to step 640, when the network element 400 determines to use the SC mode for the MBMS session, the network element 400 proceeds to step 660 to transmit a session control signaling message 490 to the network element 450 and instructs the network element 450 to transmit the MBMS user plane data for the MBMS session in a second service area. The network element 450 may then use service area definition information 482 maintained in the memory 480 to identify that MBMS user plane data corresponding to the first service area shall be transmitted in single frequency network (SFN) MBMS mode and that the MBMS user plane data corresponding to the second service area code shall be transmitted in single cell MBMS mode. The network element 450 applies service area definition information 482 and instructs the base stations (e.g. Node-Bs 220/eNBs 320) corresponding respectively to the first or the second service area to transmit user plane data for the session in the determined MBMS mode.

The embodiment described with reference to FIG. 6 has the advantage that is often convenient to use different service area definitions for different MBMS modes for user plane data intended to cover the same geographical area. In SC mode, a base station (Node-B 220/eNB 320) can transmit user plane data at full signal strength, so that the user plane data can be received in the complete coverage area of its cells, including the edges of the cells. In SFN mode, the base station (Node-B 220/eNB 320) typically uses a signal strength lower than the signal strength normally used because the user equipment 110 at the edge of a cell can combine the signals it simultaneously receives from multiple base stations. This combining of signals works well when the user equipment 110 is in a location between two cells that are part of the service area. But the combining of signals may not work if the user equipment 110 is on an outside edge of a cell on the border of the service area. Therefore to cover the same geographical area in SFN mode, the communication system 100 may need more cells than it needs to cover that same geographic area in SC mode. For example, a service area that is used to cover the geographic area of downtown Amsterdam in SFN mode may contain all the cells that are used to cover downtown Amsterdam in SC mode, plus a few cells with transmitters that are located just outside the Herengracht perimeter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method to control a multimedia broadcast multicast service (MBMS) mode of a MBMS session in a communication system, the method comprising:
    determining, at a first network element that is located outside a radio access network, to use one of a single frequency network MBMS mode (SFN mode) and a single cell MBMS mode (SC mode) for the MBMS session based on a property of the MBMS session;
    transmitting a session control signaling message from the first network element to a second network element that is located inside the radio access network, the session control signaling message instructing the second network element that user plane data for the MBMS session shall be transmitted using the determined MBMS mode by including a service area information element identifying one of a first service area and a second service area, and wherein the service area identification implies the determined MBMS mode, and where the user plane data for the MBMS session directed to the first service area is transmitted in the SFN mode and the user plane data for the MBMS session directed to the second service area is transmitted in the SC mode.

2. The method of claim 1, wherein the first network element is one of a broadcast multicast service center (BM-SC), a Gateway General Packet Radio Service (GPRS) Support Node (GGSN), a Serving GPRS support node (SGSN), MBMS Gateway, and a mobile management entity (MME).

3. The method of claim 1, wherein the session control signaling message includes an information element identifying the determined MBMS mode.

4. The method of claim 1, wherein the SFN mode enables a plurality of base stations in a service area to transmit the user plane data to one or more user equipments in synchronized fashion, and wherein the SC mode enables one or more base stations in a service area to independently schedule and transmit the user plane data to one or more user equipments.

5. The method of claim 1, further comprising
    determining, at the first network element, to use the SC mode for the MBMS session when the MBMS session is in progress using the SFN mode; and
    pursuant to the transmitting the session control signaling message,
        transmitting the user plane data for the MBMS session in the SC mode to zero or more user equipments in a cell;
        estimating, at the second network element, a property of the zero or more user equipments receiving the user plane data for the MBMS session in the cell; and
        ceasing the transmitting of the user plane data for the MBMS session in SC mode to the zero or more user equipments in the cell when the property of the zero or more user equipments in the cell meets a criterion.

6. The method of claim 1, wherein the property of the MBMS session includes one or more of: a number of user equipments that will receive user plane data for the MBMS session, locations of the user equipments that will receive the user plane data, mobility of the user equipments that will receive the user plane data, priority level of the user plane data, and media type of the user plane data.

7. The method of claim 1, wherein the second network element is one of a radio network controller (RNC), a multicast coordination entity (MCE), a Node-B, and an evolved Node-B (eNB).

8. A method to control a multimedia broadcast multicast service (MBMS) mode of a MBMS session in a communication system, the method comprising:
    determining, at a first network element that is located outside a radio access network, to use a MBMS mode based on a property of the MBMS session, wherein the MBMS mode is one of
        a single frequency network MBMS mode (SFN mode),
        a single cell MBMS mode (SC mode), and
        a local optimization MBMS mode specifying to a second network element that is located in the radio access network, to select one of the SFN mode or the SC mode based on local optimization; and
    transmitting a session control signaling message from the first network element to the second network element, the session control signaling message instructing the second network element that user plane data for the MBMS session shall be transmitted using the determined MBMS mode and the session control signaling message includes a service area information element identifying one of a first service area and a second service area, and wherein the identified service area implies the determined MBMS mode.

9. The method of claim 8, wherein the first network element is one of a broadcast multicast service center (BM-SC), a Gateway General Packet Radio Service (GPRS) Support Node (GGSN), a Serving GPRS support node (SGSN), MBMS Gateway, and a mobile management entity (MME).

10. The method of claim 8, wherein the session control signaling message includes an information element identifying the determined MBMS mode.

11. The method of claim 8, where the user plane data for the MBMS session directed to the first service area is transmitted in the SFN mode and the user plane data for the MBMS session directed to the second service area is transmitted in the single cell mode.

12. The method of claim 8, wherein the property of the MBMS session includes one or more of: a number of user equipments that will receive user plane data for the MBMS session, locations of the user equipments that will receive the user plane data, mobility of the user equipments that will receive the user plane data, priority level of the user plane data, and media type of the user plane data.

13. The method of claim 8, wherein the second network element is one of a radio network controller (RNC), a multicast coordination entity (MCE), a Node-B, and an evolved Node-B (eNB).

14. A method to control a multimedia broadcast multicast service (MBMS) mode of a MBMS session in a communication system, the method comprising:
    maintaining, at a first network element and at a second network element, information related to a first service area identifying a first set of cells and a second service area identifying a second set of cells, where the first set of cells substantially comprises the second set of cells;

maintaining at the first network element and at the second network element, information identifying that a MBMS user plane data corresponding to the first service area shall be transmitted in single frequency network MBMS mode and that the MBMS user plane data corresponding to the second service area code shall be transmitted in single cell MBMS mode;

determining, at the first network element, to use one of a single frequency network MBMS mode and a single cell MBMS mode for the MBMS session based on a property of the MBMS session;

when determining to use the single frequency network MBMS mode, transmitting a first session control signaling message from the first network element to the second network element, the first session control signaling message instructing the second network element to transmit the MBMS session in the first service area; and when determining to use the single cell MBMS mode, transmitting a second session control signaling message from the first network element to the second network element, the second session control signaling message instructing the second network element to transmit the MBMS session in the second service area.

15. The method of claim 14, wherein the first network element is one of a broadcast multicast service center (BM-SC), a Gateway General Packet Radio Service (GPRS) Support Node (GGSN), a Serving GPRS support node (SGSN), MBMS Gateway, and a mobile management entity (MME).

16. The method of claim 14, wherein the second network element is one of a radio network controller (RNC), a multicast coordination entity (MCE), a Node-B, and an evolved Node-B (eNB).

17. The method of claim 14, wherein the first session control signaling message includes a service area code identifying the first service area and the second session control signaling message includes a service area code identifying the second service area.

18. The method of claim 14, wherein the property of the MBMS session includes one or more of: a number of user equipments that will receive user plane data for the MBMS session, locations of the user equipments that will receive the user plane data, mobility of the user equipments that will receive the user plane data, priority level of the user plane data, and media type of the user plane data.

* * * * *